US011397809B2

United States Patent
Baranwal et al.

(10) Patent No.: US 11,397,809 B2
(45) Date of Patent: Jul. 26, 2022

(54) PROTECTION SCHEME FOR SENSOR SEGMENTATION IN VIRTUALIZATION APPLICATION

(71) Applicant: STMicroelectronics International N.V., Geneva (CH)

(72) Inventors: Deepak Baranwal, Greater Noida (IN); Nirav Prashantkumar Trivedi, Noida (IN); Sandip Atal, Bengaluru (IN)

(73) Assignee: STMicroelectronics International N.V., Geneva (CH)

( * ) Notice: Subject to any disclaimer, the term of this patent is extended or adjusted under 35 U.S.C. 154(b) by 459 days.

(21) Appl. No.: 16/579,415

(22) Filed: Sep. 23, 2019

(65) Prior Publication Data

US 2021/0089651 A1 Mar. 25, 2021

(51) Int. Cl.
| | |
|---|---|
| *G06F 21/55* | (2013.01) |
| *G06F 21/75* | (2013.01) |
| *G06F 9/455* | (2018.01) |
| *G06F 13/16* | (2006.01) |
| *H03M 3/00* | (2006.01) |
| *H03M 1/38* | (2006.01) |

(52) U.S. Cl.
CPC ........ *G06F 21/554* (2013.01); *G06F 9/45558* (2013.01); *G06F 13/1673* (2013.01); *G06F 21/75* (2013.01); *G06F 2009/45579* (2013.01); *H03M 1/38* (2013.01); *H03M 3/458* (2013.01)

(58) Field of Classification Search
CPC ... G06F 9/45558; G06F 13/1673; G06F 21/75
See application file for complete search history.

(56) References Cited

U.S. PATENT DOCUMENTS

| | | | | |
|---|---|---|---|---|
| 8,595,385 | B1 * | 11/2013 | Shapiro | G06F 13/385 |
| | | | | 710/52 |
| 10,002,103 | B2 * | 6/2018 | Kris | G06F 13/1673 |
| 2003/0189930 | A1 * | 10/2003 | Terrell | H04L 49/90 |
| | | | | 370/389 |

(Continued)

OTHER PUBLICATIONS

O. Sander et al, The promised future of multi-core processors in avionics systems, Springer (Year: 2016).*

(Continued)

*Primary Examiner* — Shanto Abedin
(74) *Attorney, Agent, or Firm* — Crowe & Dunlevy

(57) ABSTRACT

An embedded system includes a peripheral and system-on-a-chip executing virtual machines and a hypervisor. The peripheral includes a crossbar circuit receiving digital sensor signals and selectively outputting the digital sensor signals to different outputs, queue circuits each receiving a different one of the digital sensor signals from the crossbar circuit, and queue protection circuits associated with the queue circuits and selectively permitting access to one of the queue circuits by the virtual machines. The hypervisor controls the queue protection circuits to set which of the virtual machines may access which queue circuits. A sensor protection circuit selectively permits reading of the digital sensor signals from the crossbar circuit by the queue circuits. The hypervisor controls the sensor protection circuit to set which of the queue circuits may access each of the digital sensor signals from the crossbar circuit.

24 Claims, 2 Drawing Sheets

(56) References Cited

U.S. PATENT DOCUMENTS

| | | | |
|---|---|---|---|
| 2010/0235675 A1* | 9/2010 | Subramanian | G06F 13/4022 |
| | | | 710/316 |
| 2010/0251268 A1* | 9/2010 | Cardona | H04L 49/90 |
| | | | 719/327 |
| 2012/0151472 A1 | 6/2012 | Koch et al. | |
| 2012/0159483 A1 | 6/2012 | He et al. | |
| 2016/0267047 A1* | 9/2016 | Kris | G06F 13/385 |
| 2016/0359913 A1 | 12/2016 | Gupta et al. | |
| 2017/0075710 A1* | 3/2017 | Prasad | H04L 41/0893 |
| 2018/0293776 A1* | 10/2018 | Ray | G09G 5/363 |

OTHER PUBLICATIONS

Intel Corporation: "Intelligent Queueing Technologies for Virtualization—An Intel-VMware Perspective: Enhanced Network Performance in Virtualized Servers," Copyright (c) 2008, 4 pages.

\* cited by examiner

PROTECTION SCHEME FOR SENSOR SEGMENTATION IN VIRTUALIZATION APPLICATION

TECHNICAL FIELD

This disclosure is related to the field of data interfaces, and in particular, to the protection of sensor data from unauthorized access by virtual machines running on a system on a chip external to the sensors, and the protection of sensor data streams in a peripheral within the system on a chip from unauthorized access by queues in the peripheral.

BACKGROUND

Embedded applications, such as automotive systems, may include a system on a chip (SoC) that uses internal converters to receive input from external sensors and convert the sensor inputs to a digital data to be used for further processing by a CPU or multiple CPUs within the SoC. As the processing power available to such SoCs has grown, it has become common to execute multiple virtual machines on such SoCs, with each virtual machine executing different functions. This helps to provide for protection against errors, since an error or crash with one virtual machine will be isolated from other virtual machines.

Due to this virtualization, a need arises for an interface between the virtual machines executing on the CPU within the SoC and the various peripherals within the SoC. Current systems assign identification numbers to each virtual machine, and pair these virtual machine identification numbers to peripherals on an on-chip network level so as to permit or deny access to each peripheral on a per-virtual machine basis.

This, however, does not permit multiple virtual machines to access the same peripheral, which can lead to replication of peripherals leading to more area and power consumption. Therefore, further development is needed.

SUMMARY

One aspect claimed herein is directed to a system including a system on a chip (SoC) having one or more central processing units (CPU) configured to execute a plurality of virtual machines. The SoC also includes a peripheral. The peripheral includes a crossbar circuit configured to receive a plurality of digital sensor signals and to selectively output the plurality of digital sensor signals to different outputs. The peripheral also includes a plurality of queue circuits, each of the plurality of queue circuits receiving a different one of the plurality of digital sensor signals from the crossbar circuit. The peripheral further includes a plurality of queue protection circuits associated with the plurality of queue circuits, each of the plurality of queue protection circuits configured to selectively permit access to one of the plurality of queue circuits by the plurality of virtual machines. The CPU is also configured to execute a hypervisor for the plurality of virtual machines, the hypervisor controlling the plurality of queue protection circuits to set which of the plurality of virtual machines may access each of the plurality of queue circuits.

Each of the plurality of queue protection circuits may selectively permit access to its associated one of the plurality of queue circuits by permitting reading from that queue circuit and by permitting issuing commands to that queue circuit.

A sensor protection circuit may be associated with the crossbar circuit, the sensor protection circuit configured to selectively permit reading of the plurality of digital sensor signals from the crossbar circuit by the plurality of queue circuits. The hypervisor may also be configured to control the sensor protection circuit to set which of the plurality of queue circuits may access each of the plurality of digital sensor signals from the crossbar circuit.

The sensor protection circuit may include status registers and control registers. The hypervisor may program into the control registers the queue ID numbers of which of the plurality of queue circuits are permitted to access which of the plurality of digital sensor signals. The sensor protection unit may include control circuitry. The control circuitry may be configured to, for each queue circuit requesting access to at least one of the plurality of digital sensor signals: compare the queue ID number of that queue circuit to the queue ID numbers stored in the control registers; permit access by that queue circuit to those of the plurality of digital sensor signals for which the queue ID number of that queue circuit is stored in the control registers as being permitted to access; and program the status registers with the queue ID number of each queue circuit requesting access to one of the plurality of digital sensor signals for which the queue ID number of that queue circuit is not stored in the control registers as being permitted to access.

The hypervisor may control the plurality of queue protection circuits such that one of the plurality of queue circuits is inaccessible by the plurality of virtual machines and is instead only accessible by the hypervisor.

The hypervisor may control the queue protection circuits such that one of the plurality of queue circuits is inaccessible by the plurality of virtual machines and is instead only accessible by the hypervisor, while each of the others of the plurality of queue circuits is only accessible by a single different one of the virtual machines.

Each queue circuit may be allocated to a certain application type or use case.

Each queue protection circuit may include status registers, and may also include control registers into which the hypervisor programs virtual machine ID numbers of which of the plurality of virtual machines are permitted to access the queue circuit associated with that queue protection circuit. Each queue protection circuit may also include control circuitry configured to, for each virtual machine requesting access to the queue circuit associated with that queue protection circuit: compare the virtual machine ID number of each virtual machine requesting access to the virtual machine ID numbers stored in the control registers; permit access to each virtual machine requesting access having a virtual machine ID number matching one of the virtual machine ID numbers stored in the control registers; and program the status registers with the virtual machine ID number of each virtual machine requesting access that does not match one of the virtual machine ID numbers stored in the control registers.

An analog to digital converter may be configured to digitize a plurality of analog sensor signals to produce the plurality of digital sensor signals.

The analog to digital converter may include a successive approximation based analog to digital converter.

Each queue circuit may be configured to selectively send control commands to the crossbar circuit indicating at least one of an identification number of that queue circuit, which of the plurality of digital sensor signals that queue circuit desires to receive, and an analog to digital conversion type desired for those of the plurality of digital sensor signals that queue circuit desires to receive.

Each of the plurality of queue circuits may include a FIFO buffer.

Another aspect claimed herein is directed to a system including a system on a chip (SoC) with a central processing unit (CPU) configured to execute a plurality of virtual machines. The SoC includes a peripheral. The peripheral includes a crossbar circuit configured to receive a plurality of digital sensor signals and to selectively output the plurality of digital sensor signals to different outputs. The peripheral also includes a plurality of queue circuits, each of the plurality of queue circuits receiving a different one of the plurality of digital sensor signals from the crossbar circuit. A sensor protection circuit is associated with the crossbar circuit, the sensor protection circuit configured to selectively permit reading of the plurality of digital sensor signals from the crossbar circuit by the plurality of queue circuits. The CPU is configured to execute a hypervisor controlling the sensor protection circuit to set which of the plurality of queue circuits may access each of the plurality of digital sensor signals from the crossbar circuit.

The sensor protection circuit may include status registers, and may also include control registers into which the hypervisor programs queue ID numbers of which of the plurality of queue circuits is permitted to access which of the plurality of digital sensor signals. The sensor protection circuit may also include control circuitry configured to, for each queue circuit requesting access to at least one of the plurality of digital sensor signals: compare the queue ID number of that queue circuit to the queue ID numbers stored in the control registers; permit access by that queue circuit to those of the plurality of digital sensor signals for which the queue ID number of that queue circuit is stored in the control registers as being permitted to access; and program the status registers with the queue ID number of each queue circuit requesting access to one of the plurality of digital sensor signals for which the queue ID number of that queue circuit is not stored in the control registers as being permitted to access.

Each of the plurality of queue circuits may be a FIFO buffer.

The crossbar circuit may be configured to digitize a plurality of analog sensor signals to produce the plurality of digital sensor signals.

Each queue circuit may be configured to selectively send control commands to the crossbar circuit indicating at least one of an identification number of that queue circuit, which of the plurality of digital sensor signals that queue circuit desires to receive, and an analog to digital conversion type desired for those of the plurality of digital sensor signals that queue circuit desires to receive.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
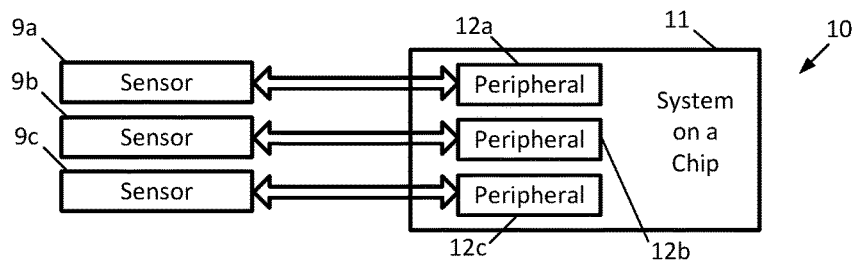
FIG. 1 is a block diagram of an embedded system in accordance with this disclosure.

An embedded system 10, such as that used in a motor vehicle, is shown in FIG. 1. The embedded system 10 includes a system on a chip (SoC) 11 including peripherals 12a-12c interfaced with multiple sensors 9a-9c, with it being understood that there may be any number of such sensors and peripherals. The sensors 9a-9c may be any type of modules, such as voltage sensors, temperature sensors, pressure sensors, fluid level sensors, image sensors, time of flight ranging sensors, etc. These sensors 9a-9c are connected to analog-to-digital converter modules inside the peripherals 12a-12c of the SoC 11 which control the configuration of external sensors as well as convert the sensor's analog data to a digital value to be processed.

Figure 2:
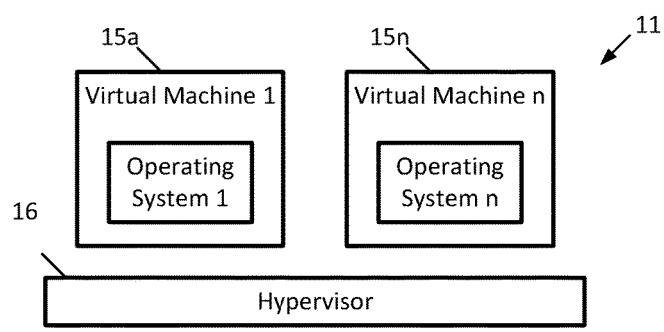
FIG. 2 is a block diagram of a hypervisor and virtual machines executing on the system on a chip of the embedded system of FIG. 1.

As shown in FIG. 2, the SoC 11 executes a hypervisor 16, which can also be referred to as a virtual machine monitor. The hypervisor 16 creates and manages multiple virtual machines 15a . . . 15n (n being any integer), with each virtual machine executing its own operating system. The hypervisor 16 creates virtual resources from physical resources such as memory and controls access by the virtual machines 15a . . . 15n to these virtual resources, thereby enabling the same physical resources to be used by multiple virtual machines. The hypervisor 16 arranges the virtual resources to be walled off from each other, such that each virtual machine sees and can access only its own virtual resources.

Figure 3:
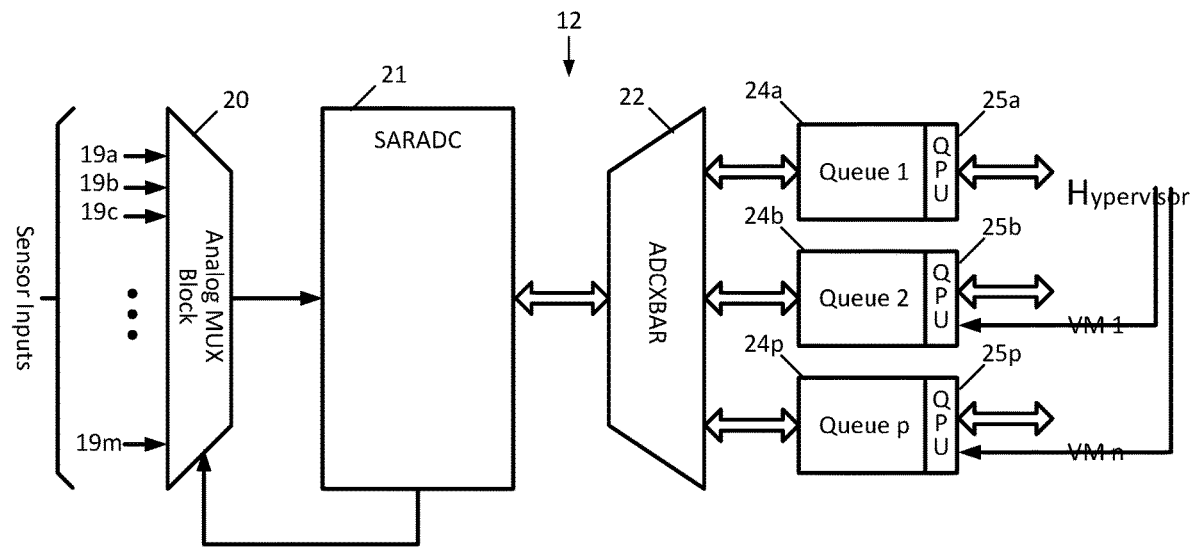
FIG. 3 is a block diagram of a first embodiment of circuitry on a peripheral of FIG. 1 for managing interface between the peripheral and the virtual machines of FIG. 2.

Now described with reference to FIG. 3 is a design for a peripheral 12 usable with the embedded system 10 of FIG. 1. The peripheral 12 includes an analog multiplexing circuit 20 receiving m analog sensor inputs, labeled as 19a . . . 19m, from a given sensor 9a-9c. An analog to digital converter (ADC) 21 such as successive approximation converter cooperates with the analog multiplexing circuit 20 to digitize the sensor inputs 19a . . . 19m (m being any integer), and to provide the digitized sensor inputs to a crossbar circuit 22. The crossbar circuit 22 selectively provides ones of the digitized sensor inputs to queues 24a . . . 24p (p being any integer). Each queue 24a . . . 24p is a first in first out (FIFO) buffer.

Each queue 24a . . . 24p may send control commands and data to the crossbar circuit 22, such as the identification number of that queue, one or more channel numbers of the ADC 21 that the queue requests to receive (e.g., which of the sensor inputs 19a . . . 19m that the queue requests to receive in digitized form), and whether the analog to digital conversion of the selected sensor inputs 19a . . . 19m is to be performed continuously or on a different basis (periodic, single, etc). The crossbar circuit 22 may respond to commands and data received from the queues 24a . . . 24p with response signals, such as indicating that an analog to digital conversion of one or more given sensor inputs 19a . . . 19m is complete, or such as the digitized versions of the sensor inputs 19a . . . 19m.

Figure 4:
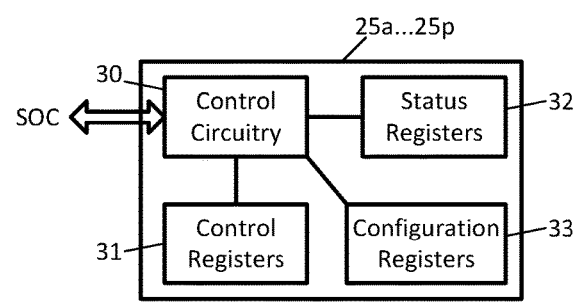
FIG. 4 is a block diagram of a sample queue protection unit such as may be used with the queues of FIGS. 3, 5, and 6.

Each virtual machine 15a . . . 15n has a virtual machine identification number (VMID) associated with it. Each queue 24a . . . 24p has a queue protection unit 25a . . . 25p associated therewith. The structure of the queue protection units 25a . . . 25p is shown in FIG. 4, where it can be seen that each queue protection unit 25a . . . 25p includes control circuitry 30 interfaced with the SOC for potential communication with the hypervisor 16 and virtual machines 15a . . . 15n, control registers 31 for storing the VMID of virtual machines 15a . . . 15n which are permitted to access the queue 24a . . . 24p associated with that queue protection unit, status registers 31 for storing the VMID of virtual machines 15a . . . 15n which request access but which are not permitted access, and configuration registers 33 controlling the functionality of the queue protection unit.

The hypervisor 16 programs the control registers 31 of the queue protection units 25a . . . 25p with the VMID numbers of the virtual machines 15a . . . 15n allowed to access the queues 24a . . . 24p associated with those queue protection units. When a given queue from among the queues 24a . . . 24p receives an access request (such as a read request or a command, either of which can be in the form of programming bits into the configuration registers 33) from a virtual machine 15a . . . 15n, the control circuitry 30 of the queue protection unit from among the queue protection units 25a . . . 25p associated with the given queue checks whether the VMID of the requesting queue is stored in the status registers 31 of the given queue protection unit. If the VMID of the requesting queue is stored in the status registers 31 of the given queue protection unit, then access to the given queue is granted to the requesting virtual machine 15a . . . 15n by the control circuitry 30 of the given queue protection unit. If, however, the VMID of the requesting queue is not stored in the status registers 31 of the given queue protection unit, then access to the given queue is not granted to the requesting virtual machine 15a . . . 15n by the control circuitry 30 of the given queue protection unit, and instead the VMID of the requesting queue is stored in the status registers 32 as an unauthorized access attempt. By an access request, both read access and command access (e.g., ability to send commands to, ability to program the configuration registers 33) is meant, with it being understood that in some cases read access but not command access may be granted to a given virtual machine.

Figure 5:
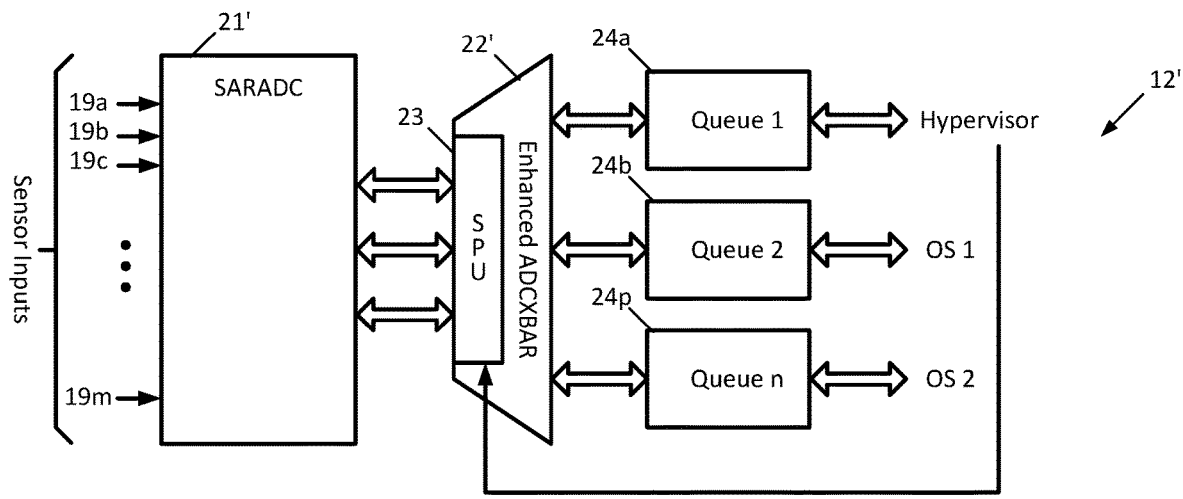
FIG. 5 is a block diagram of a second embodiment of circuitry on a peripheral of FIG. 1 for managing interface between the peripheral and the virtual machines of FIG. 2.

Another embodiment of a peripheral 12' is shown in FIG. 5. Here, notice that the queues 24a . . . 24p lack associated queue protection units, and that the ADC 21' directly receives the analog sensor inputs 19a . . . 19m.

Figure 6:
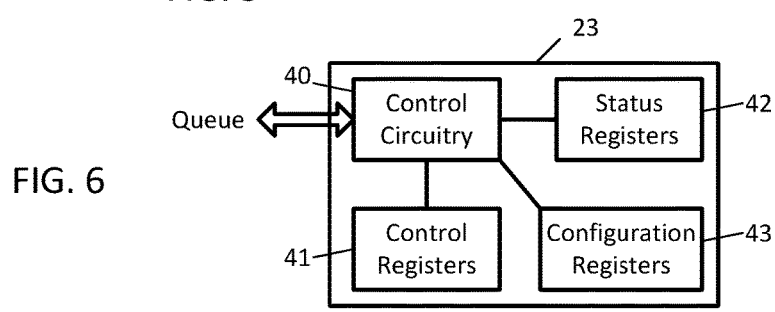
FIG. 6 is a block diagram of a sample sensor protection unit such as may be used with the crossbar circuitry of FIGS. 5 and 7.

Notice that the crossbar circuit 22' contains a sensor protection unit 23. Each queue 24a . . . 24p has a queue identification number (QID) associated with it. As shown in FIG. 6, the sensor protection unit 23 includes control circuitry 40 interfaced with the queues 24a . . . 24p for facilitating potential data passage from the ADC 21' to the queues 24a . . . 24p, control registers 41 for storing QIDs of the queues 24a . . . 24p and which ADC channels (i.e. which sensor inputs 19a . . . 19m) those queues 24a . . . 24p are permitted to access, status registers 42 for storing the QIDs of queues 24a . . . 24p which request access to ADC channels to which they are not permitted access, and configuration registers 43 controlling the functionality of the sensor protection unit 23.

The hypervisor 16 programs the control registers 41 of the sensor protection unit 23 with the QID numbers of the queues 24a . . . 24p together with which ADC channels those queues are allowed to access. When the crossbar circuit 22' receives an access request (such as a command to convert a given analog sensor input 19a . . . 19m into a digital sensor input, which can be in the form of programming bits into the configuration registers 43) from a queue 24a . . . 24p, the control circuitry 40 checks whether the bits stored in the control registers 41 indicate that the QID of that queue is permitted to access the requested ADC channel. If the QID is permitted to access the requested ADC channel, then access is granted to the requesting queue 24a . . . 24p by the control circuitry 40. If the QID is not permitted to access the requested ADC channel, then access is not granted to the requesting queue 24a . . . 24p by the control circuitry 40, and instead the QID and the requested ADC channel are stored in the status registers 42 as an unauthorized access attempt.

By an access request, both read access and command access (e.g., ability to receive data from a given ADC channel, as well as ability to send commands to and program the configuration registers 43) is meant, with it being understood that in some cases read access may be granted but not command access.

Figure 7:
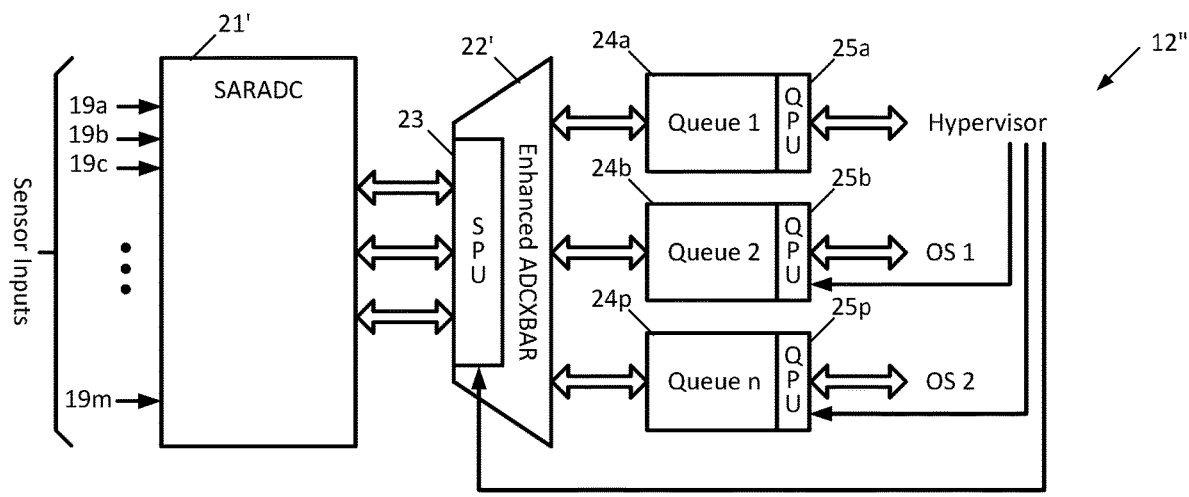
FIG. 7 is a block diagram of a third embodiment of circuitry on a peripheral of FIG. 1 for managing interface between the peripheral and the virtual machines of FIG. 2.

Another embodiment of a peripheral 12" is shown in FIG. 7. This peripheral 12" has identical functionality to the peripheral 12' of FIG. 5, except it also includes the queue protection units 25a . . . 25p as described with reference to the peripheral 12 shown in FIG. 3.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A system, comprising:
 a system on a chip (SoC) comprising a central processing unit (CPU) configured to execute a plurality of virtual machines;
 wherein the SoC also includes a peripheral, the peripheral comprising:
  a crossbar circuit configured to receive a plurality of digital sensor signals and to selectively output the plurality of digital sensor signals to different outputs;
  a plurality of queue circuits, each of the plurality of queue circuits receiving a different one of the plurality of digital sensor signals from the crossbar circuit and configured to provide control signals for a plurality of digital sensor modules that generated the plurality of digital sensor signals; and
  a plurality of queue protection circuits associated with the plurality of queue circuits, each of the plurality of queue protection circuits configured to selectively permit access to one of the plurality of queue circuits by the plurality of virtual machines; and
 wherein the CPU is also configured to execute a hypervisor for the plurality of virtual machines, the hypervisor controlling the plurality of queue protection circuits to set which of the plurality of virtual machines may access each of the plurality of queue circuits.

2. The system of claim 1, wherein each of the plurality of queue protection circuits selectively permits access to its associated one of the plurality of queue circuits by permitting reading from that queue circuit and by permitting issuing commands to that queue circuit.

3. The system of claim 1, further comprising a sensor protection circuit associated with the crossbar circuit, the sensor protection circuit configured to selectively permit reading of the plurality of digital sensor signals from the crossbar circuit by the plurality of queue circuits; and wherein the hypervisor is also configured to control the sensor protection circuit to set which of the plurality of queue circuits may access each of the plurality of digital sensor signals from the crossbar circuit.

4. The system of claim 3, wherein the sensor protection circuit comprises:
   status registers;
   control registers into which the hypervisor programs queue identification (ID) numbers of which of the plurality of queue circuits is permitted to access which of the plurality of digital sensor signals; and
   control circuitry configured to, for each queue circuit requesting access to at least one of the plurality of digital sensor signals:
      compare the queue ID number of that queue circuit to the queue ID numbers stored in the control registers;
      permit access by that queue circuit to those of the plurality of digital sensor signals for which the queue ID number of that queue circuit is stored in the control registers as being permitted to access; and
      indicate occurrence of a violation based upon at least one queue circuit requesting access to one of the plurality of digital signals for which the queue ID number of that queue circuit is not stored in the control registers as being permitted to access.

5. The system of claim 4, wherein the control circuitry indicates occurrence of the violation by programming the status registers with the queue ID number of each queue circuit requesting access to one of the plurality of digital sensor signals for which the queue ID number of that queue circuit is not stored in the control registers as being permitted to access.

6. The system of claim 4, wherein the control circuitry indicates occurrence of the violation by generating a system level interrupt to notify the hypervisor of the occurrence of the violation.

7. The system of claim 1, wherein the hypervisor controls the plurality of queue protection circuits such that one of the plurality of queue circuits is inaccessible by the plurality of virtual machines and is instead only accessible by the hypervisor.

8. The system of claim 1, wherein the hypervisor controls the queue protection circuits such that one of the plurality of queue circuits is inaccessible by the plurality of virtual machines and is instead only accessible by the hypervisor, while each other of the plurality of queue circuits is only accessible by a single different one of the virtual machines.

9. The system of claim 1, wherein each queue circuit is allocated to a certain application type or use case.

10. The system of claim 1, wherein each queue protection circuit comprises:
    status registers;
    control registers into which the hypervisor programs virtual machine identification (ID) numbers of which of the plurality of virtual machines are permitted to access the queue circuit associated with that queue protection circuit; and
    control circuitry configured to, for each virtual machine requesting access to the queue circuit associated with that queue protection circuit:
       compare the virtual machine ID number of each virtual machine requesting access to the virtual machine ID numbers stored in the control registers;
       permit access to each virtual machine requesting access having a virtual machine ID number matching one of the virtual machine ID numbers stored in the control registers; and
       indicate occurrence of a violation based upon at least one virtual machine requesting access that does not have a virtual machine ID number matching one of the virtual machine ID numbers stored in the control registers.

11. The system of claim 10, wherein the control circuitry indicates occurrence of the violation by programming the status registers with the virtual machine ID number of each virtual machine requesting access that does not match one of the virtual machine ID numbers stored in the control registers.

12. The system of claim 10, wherein the control circuitry indicates occurrence of the violation by generating a system level interrupt to notify the hypervisor of the occurrence of the violation.

13. The system of claim 1, further comprising an analog to digital converter configured to digitize a plurality of analog sensor signals to produce the plurality of digital sensor signals.

14. The system of claim 13, wherein the analog to digital converter comprises a successive approximation based analog to digital converter.

15. The system of claim 13, wherein the analog to digital converter comprises a sigma delta based analog to digital converter.

16. The system of claim 13, wherein the analog to digital converter comprises a programmable reference based comparator.

17. The system of claim 13, wherein each queue circuit is configured to selectively send control commands to the crossbar circuit indicating at least one of an identification number of that queue circuit, which of the plurality of digital sensor signals that queue circuit desires to receive, and an analog to digital conversion type desired for those of the plurality of digital sensor signals that queue circuit desires to receive.

18. The system of claim 1, wherein each of the plurality of queue circuits comprises a first in first out (FIFO) buffer.

19. A system, comprising:
    a system on a chip (SoC) comprising a central processing unit (CPU) configured to execute a plurality of virtual machines;
    wherein the SoC includes a peripheral, the peripheral comprising:
       a crossbar circuit configured to receive a plurality of digital sensor signals and to selectively output the plurality of digital sensor signals to different outputs;
       a plurality of queue circuits, each of the plurality of queue circuits receiving a different one of the plurality of digital sensor signals from the crossbar circuit; and
       a sensor protection circuit associated with the crossbar circuit, the sensor protection circuit configured to selectively permit reading of the plurality of digital sensor signals from the crossbar circuit by the plurality of queue circuits; and wherein the CPU is configured to execute a hypervisor controlling the sensor protection circuit to set which of the plurality of queue circuits may access each of the plurality of digital sensor signals from the crossbar circuit.

20. The system of claim 19, wherein the sensor protection circuit comprises:
   status registers;
   control registers into which the hypervisor programs queue identification (ID) numbers of which of the plurality of queue circuits is permitted to access which of the plurality of digital sensor signals; and
   control circuitry configured to, for each queue circuit requesting access to at least one of the plurality of digital sensor signals,
      compare the queue ID number of that queue circuit to the queue ID numbers stored in the control registers;
      permit access by that queue circuit to those of the plurality of digital sensor signals for which the queue ID number of that queue circuit is stored in the control registers as being permitted to access; and
      indicate occurrence of a violation based upon at least one queue circuit requesting access to one of the plurality of digital signals for which the queue ID number of that queue circuit is not stored in the control registers as being permitted to access.

21. The system of claim 20, wherein the control circuitry indicates occurrence of the violation by programming the status registers with the queue ID number of each queue circuit requesting access to one of the plurality of digital sensor signals for which the queue ID number of that queue circuit is not stored in the control registers as being permitted to access.

22. The system of claim 19, wherein each of the plurality of queue circuits comprises a first in first out (FIFO) buffer.

23. The system of claim 19, wherein the crossbar circuit is configured to digitize a plurality of analog sensor signals to produce the plurality of digital sensor signals.

24. The system of claim 19, wherein each queue circuit is configured to selectively send control commands to the crossbar circuit indicating at least one of an identification number of that queue circuit, which of the plurality of digital sensor signals that queue circuit desires to receive, and an analog to digital conversion type desired for those of the plurality of digital sensor signals that queue circuit desires to receive.

* * * * *